(12) United States Patent
Goodson (10) Patent No.: US 11,357,607 B2
(45) Date of Patent: Jun. 14, 2022

(54) DENTAL IRRIGATION DEVICE (71) Applicant: Mark E. Goodson, Corinth, TX (US)

(72) Inventor: Mark E. Goodson, Corinth, TX (US)

(*) Notice: Subject to any disclaimer, the term of this patent is extended or adjusted under 35 U.S.C. 154(b) by 0 days.

(21) Appl. No.: 17/552,088

(22) Filed: Dec. 15, 2021

(65) Prior Publication Data
US 2022/0104926 A1 Apr. 7, 2022

Related U.S. Application Data

(63) Continuation of application No. 16/848,835, filed on Apr. 14, 2020, now Pat. No. 11,202,696.

(60) Provisional application No. 62/833,736, filed on Apr. 14, 2019.

(51) Int. Cl.
| | | |
|---|---|---|
| *A61C 17/02* | (2006.01) | |
| *B05B 9/00* | (2006.01) | |
| *B05B 9/04* | (2006.01) | |
| *B01F 15/06* | (2006.01) | |
| *B01F 1/00* | (2006.01) | |
| *B01F 21/00* | (2022.01) | |
| *B01F 35/92* | (2022.01) | |
| *B01F 35/90* | (2022.01) | |
| *B01F 101/19* | (2022.01) | |

(52) U.S. Cl.
CPC .............. *A61C 17/02* (2013.01); *B01F 21/30* (2022.01); *B01F 35/92* (2022.01); *B05B 9/002* (2013.01); *B05B 9/0403* (2013.01); *B01F 2035/99* (2022.01); *B01F 2101/19* (2022.01)

(58) Field of Classification Search
CPC .............. B67D 1/0895; A47J 31/0573; A61C 17/0205; A61C 17/02; B01F 11/0258
See application file for complete search history.

(56) References Cited

U.S. PATENT DOCUMENTS

2008/0255498 A1* 10/2008 Houle ................ A61C 17/0211
604/20
2016/0287010 A1* 10/2016 Doglioni Majer .... F24H 9/2028

* cited by examiner

*Primary Examiner* — Elizabeth Insler (57) ABSTRACT

A dental irrigation device for heating a solution and mixing solutes within the solution. The present invention utilizes an oscillator and inductive coil to heat and/or mix the solution. A pump then delivers the heated and mixed pressurized solution from a basin ultimately into a dispenser.

22 Claims, 14 Drawing Sheets

DENTAL IRRIGATION DEVICE

CROSS REFERENCE TO RELATED APPLICATIONS

This application claims the benefit of and priority to U.S. Non-Provisional application Ser. No. 16/848,835, filed Apr. 14, 2020, set to issue as U.S. Pat. No. 11,202,696 on Dec. 21, 2021, entitled "Dental Irrigation Device" which claimed benefit of and priority to U.S. Provisional Application No. 62/833,736, filed Apr. 14, 2019, entitled "Dental Irrigation Device." These applications are incorporated by reference.

STATEMENT REGARDING FEDERALLY SPONSORED RESEARCH OR DEVELOPMENT

Not Applicable

BACKGROUND OF THE INVENTION

1. Field of the Invention

The present invention relates to a device for the aqueous irrigation of dental tissue.

2. Description of the Related Art

It is well known that dental tissue benefits from the addition of certain solutes when the teeth and gums are irrigated, with water being considered as the solvent. Such solutes include salt, mouthwashes, and hydrogen peroxide. The matter and sufficiency for which they dissolve and mix are based on two major factors, dispersion and temperature. The temperature factor is even more important in certain compounds such as salt because solubility increases as temperature rises.

One product design intended to heat irrigated water is described in U.S. Pat. No. 7,059,853. As quoted from the specification, A controlled water stream, whether streaming or pulsing may be delivered at room or tap temperature or alternatively heated to about 90 degrees Fahrenheit, for example (heating not shown). U.S. Pat. No. 8,012,111 describes the mixing of both cold and hot water from the sink water lines. However if the sink's hot water faucet is located away from the hot water heater, this system requires the water to run for a lengthy period of time wasting water.

The aforementioned solutions are imperfect and there remains a need to develop a dental irrigation device with the ability to booth heat and mix the solute and solvent in an efficient and convenient manner.

BRIEF SUMMARY OF THE INVENTION

The present invention utilizes heating and mixing componentry to raise the temperature of the water and to mix a solute within the solution before the solution is introduced into the oral cavity by way of pressurized water jet. The invention present invention comprises a basin, heating/mixing componentry, base, a pump, and a handheld dispenser. Normal tap water is placed in a basin which is delivered via pump to a dispenser. In one embodiment, an inductor coil is utilized within the basin to heat and mix the solute with the solution. In an another embodiment, a ferrous slug rotates within the basin mixing the solute with the solution. As this mixed solution is delivered to the dispenser via a pump, the solution passes through a heating chamber using a ferrous inductor coil system that heats the solution. In another embodiment, a shaker causes the basin to vibrate resulting in mixing the solute with the solution. The pressurized solution is then delivered to the dispenser which allows for a jet stream of solution to be aimed by the user at the affected dental tissue. The pressurized solution stream can dislodge particulate accumulations, thereby promoting dental health. The pump has a modulating system that can alter the solution stream to have either continuous flow or pulsed characteristics. The open top basin allows the addition of salts or medicine to the solution for treatment of medical conditions.

DETAILED DESCRIPTION OF THE INVENTION

FIGS. 1-7 disclose a first embodiment of a dental irrigation device 1 comprising a basin 10, a base 40, and a dispenser 80. The basin 10 comprises a sidewall 11, a bottom wall 12, and an open top 13. Alternatively a removable lid may be placed on top of the basin 10. The top surface 14 of the bottom wall 12 is continuous having a raised portion 15 and a lowered portion 16 connected by a slope 17. The lower portion 16 may further slope to a port 18. A first recess 20 and a second recess 21 are positioned within the bottom surface of the raised portion 15 of the bottom wall 12. A first metal connectivity tab 22, and second metal connectivity tab 23 are positioned at the top of the first recess 20 and second recess 21 respectively. A continuous notch 24 is formed at the juncture of the sidewall 11 and bottom wall 12.

Figure 1:
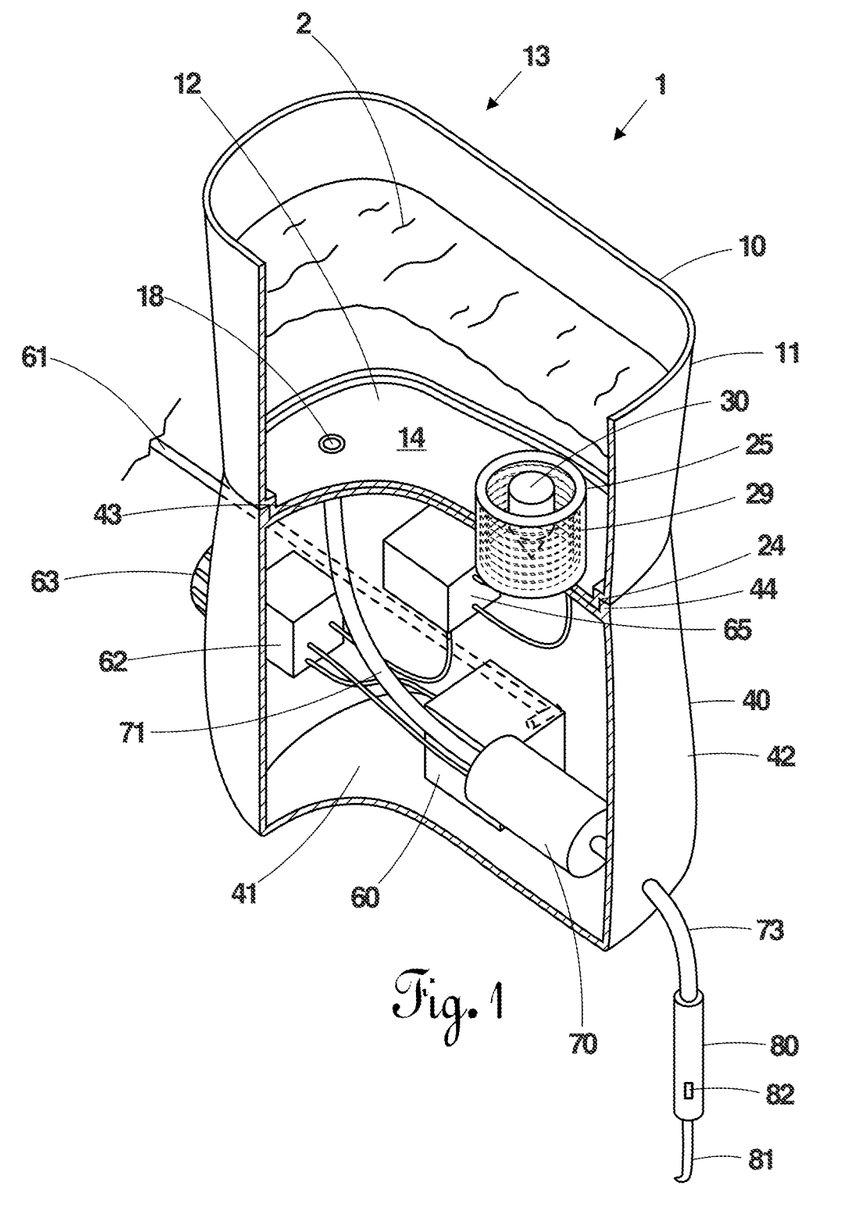
FIG. 1 is a perspective view of a first embodiment with a portion of the sidewall removed wherein the electromagnetic field is present.
Figure 2:
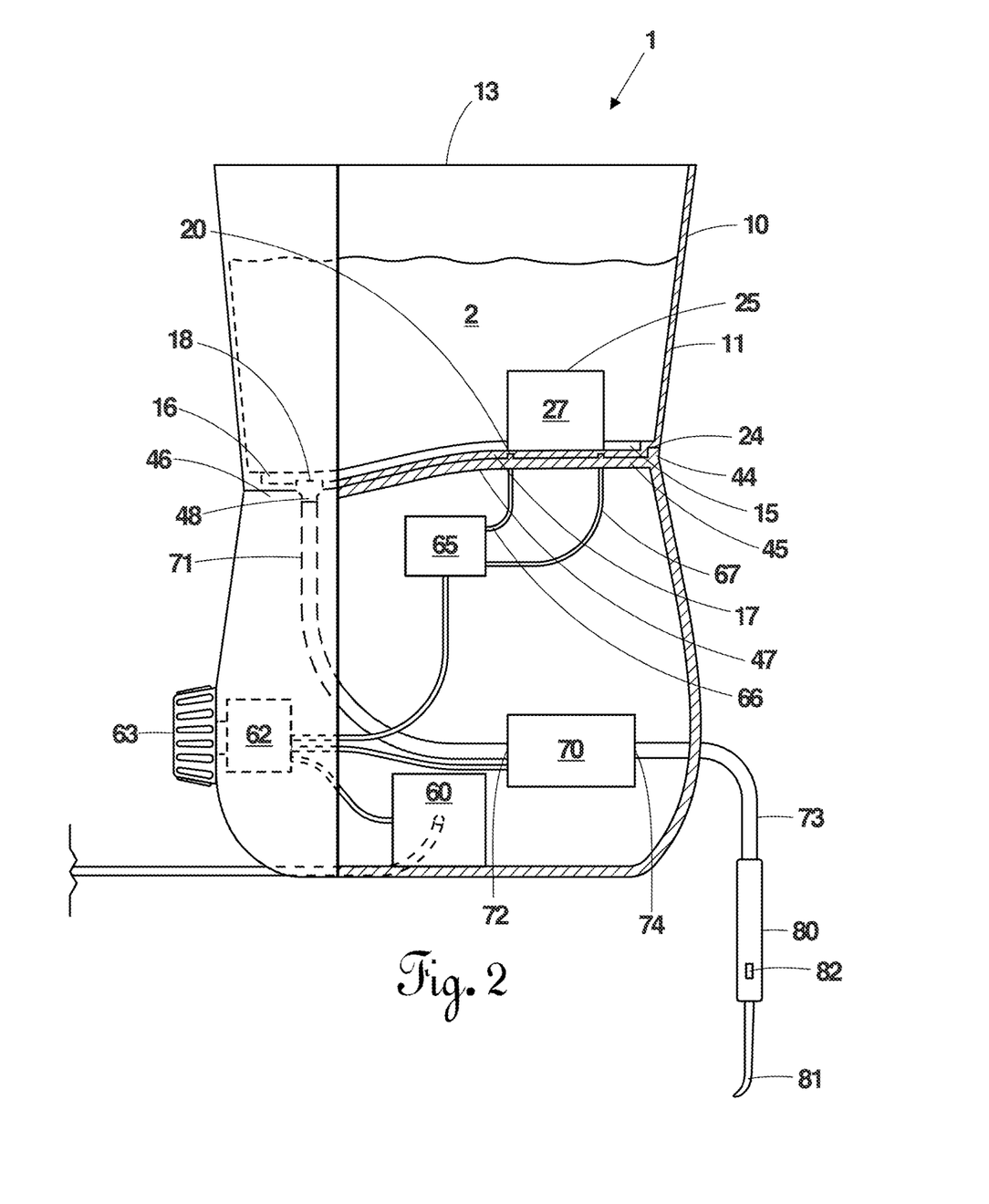
FIG. 2 is a side view of a first embodiment with a portion of the sidewall removed wherein the electromagnetic field is present.
Figure 3:
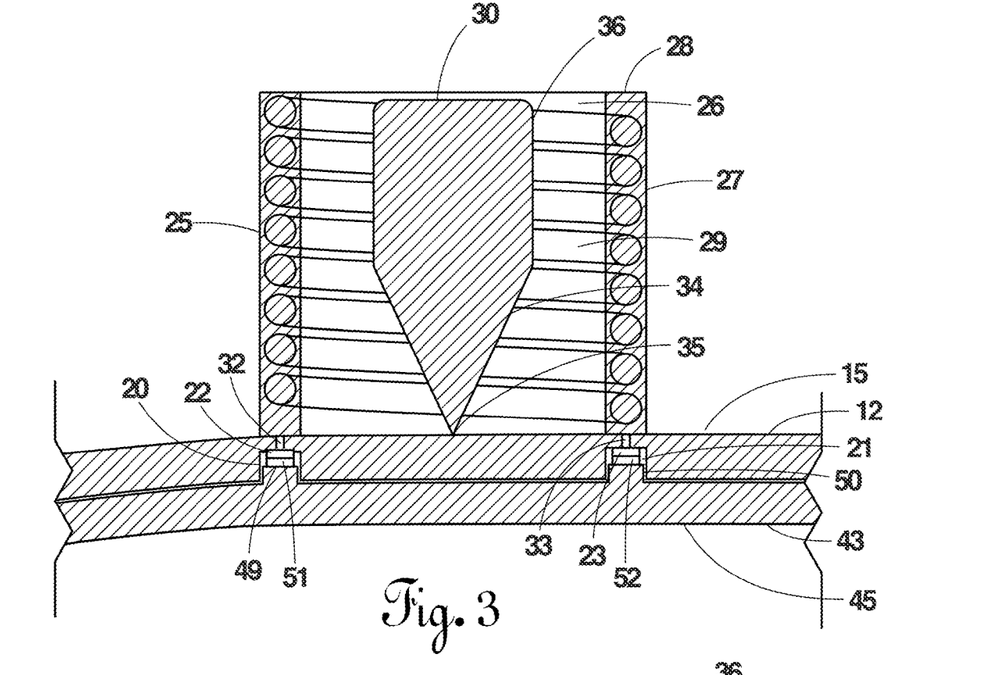
FIG. 3 is a cross-section view of the cylindrical housing of a first embodiment wherein the electromagnetic field is present.
Figure 4:
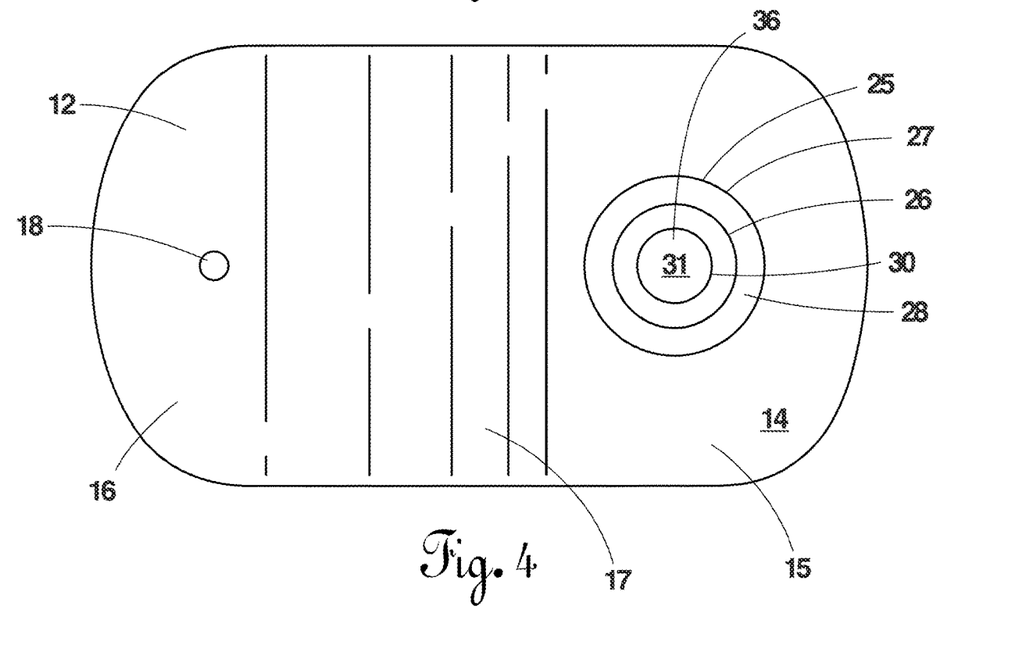
FIG. 4 is a top view of the bottom wall of the basin of a first embodiment.

A cylindrical housing 25, having an inner wall 26, outer wall 27, and top wall 28, is positioned on the raised portion 15 of the bottom wall 12 of the basin 10. The cylindrical housing 25 is further positioned such that the first recess 21 and second recess 22 are directly below the inner wall 26 and outer wall 27. An inductive coil 29, having a first end 32 and a second end 33, is positioned within the cylindrical housing 25 and wraps around the inner wall 26 filling the space between the inner wall 26 and the outer wall 27. The inner wall 26, outer wall 27, and top wall 28 of the cylindrical housing 25 are integral to prevent the solution 2 from coming into contact with the inductive coil 29. The first end 32 of the inductive coil 29 is in contact with the first metal connectivity tab 22 and the second end 33 of the inductive coil 29 is in contact with the second metal connectivity tab 23.

A ferrous slug 30 having a polymer surface coating is positioned inside the space of the cylindrical housing 25 as defined by the inner wall 26. The ferrous slug 30 comprises a conical end 34, having a point 35, and a cylindrical end 36. The point 35 of the conical end 34 rests against the top surface 14 of the bottom wall 12. A portion of the cylindrical end 36 rests against the inner wall 26 when the electromagnetic field is not present.

The base 40 comprises a bottom wall 41, sidewall 42, and top wall 43. A continuous raised ridge 44 extends from the juncture of the sidewall 42 and top wall 43. The size of the raised ridge 44 corresponds to the size of the notch 24 of the basin 10. The top wall 43 is continuous having a raised portion 45 and a lowered portion 46 connected by a slope 47. The raised portion 45, lowered portion 46, and slope 47 of the top wall 43 of the base 40 correspond to the raised portion 15, lowered portion 16, and slope 17 of the bottom wall 12 of the basin 10. An orifice 48 is positioned through the lower portion 46 of the top wall 43. The orifice 48 is sized to receive the port 18 of the basin 10. A first tab 49 and second tab 50 extend from the top surface of the top wall 43. The first tab 49 corresponds in size to the first recess 20 of the basin 10 and the second tab 50 corresponds in size to the second recess 21 of the basin 10. A third metal connectivity tab 51 is positioned on the top of the first tab 49 and a fourth metal connectivity tab 52 is positioned on the top of the second tab 50.

Figure 5:
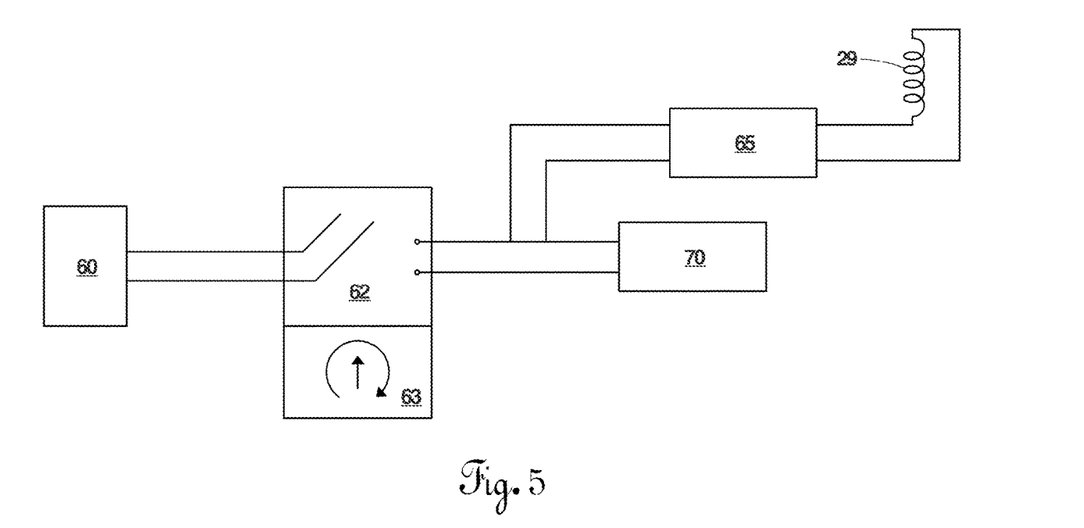
FIG. 5 is a circuit diagram of a first embodiment.

The base 40 includes a power supply module 60, controller 62, oscillator 65, pump 70, and a handheld dispenser 80. A power supply module 60, positioned within the base 40, receives power via a cord 61 from an AC source. As seen in FIG. 5, the power supply module 60 supplies power to the controller 62, oscillator 65, and pump 70. The controller 62, positioned within the base 40, is connected to an interface 63 positioned on the exterior surface 53 of the base 40. The interface 63 may be a physical dial, physical buttons, and/or a graphical user interface. The controller 62 is electronically connected to the oscillator 65 and the pump 70. The electronic oscillator 65, positioned within the base 40, is electronically connected to the third metal connectivity tab 51 via a first wire 66 and connected to the fourth metal connectivity tab 52 via a second wire 67 resulting in a complete circuit. The electronic oscillator 65 is at least capable of delivering a 40-60 kHz signal but may be higher or lower. In the preferred embodiment the oscillator generates a square wave. In the preferred embodiment the frequency is of 40 to 60 kHz is pulse wave modulated at a duty cycle of ninety percent with the signal generated for 0.9 seconds and removed for 0.1 seconds. An interface that is a mechanically driven timer may serve as the control to the oscillator 65 and may prevent the oscillator 65 from working while a user is not present and may also provide an automatic shutoff. Other safety features may be programmed into the controller 62 to prevent operation over an allotted time, prevent the oscillator 65 from operating at too high or too low of frequency, or other safety measures known in the art to include a flow switch, a water level sensor, and/or a thermostat.

A supply tube 71 is connected to the orifice 48 and to the inlet 72 of the pump 70. The supply tube 71 is in fluid communication with the basin 10 via port 18 and orifice 48. A dispensing tube 73 is connected to the outlet 74 of the pump 70 and the handheld dispenser 80. The supply tube 71 and pump 70 are positioned within the base 40 with a portion of the dispensing tube 73 positioned within the base 40 and extending through the sidewall 42 of the base 40. The pump 70 may provide a continuous flow or modulated flow. The handheld dispenser 80 has tip 81 and is operated by a manual valve 82 which may pause or stop the flow of solution.

Figure 6:
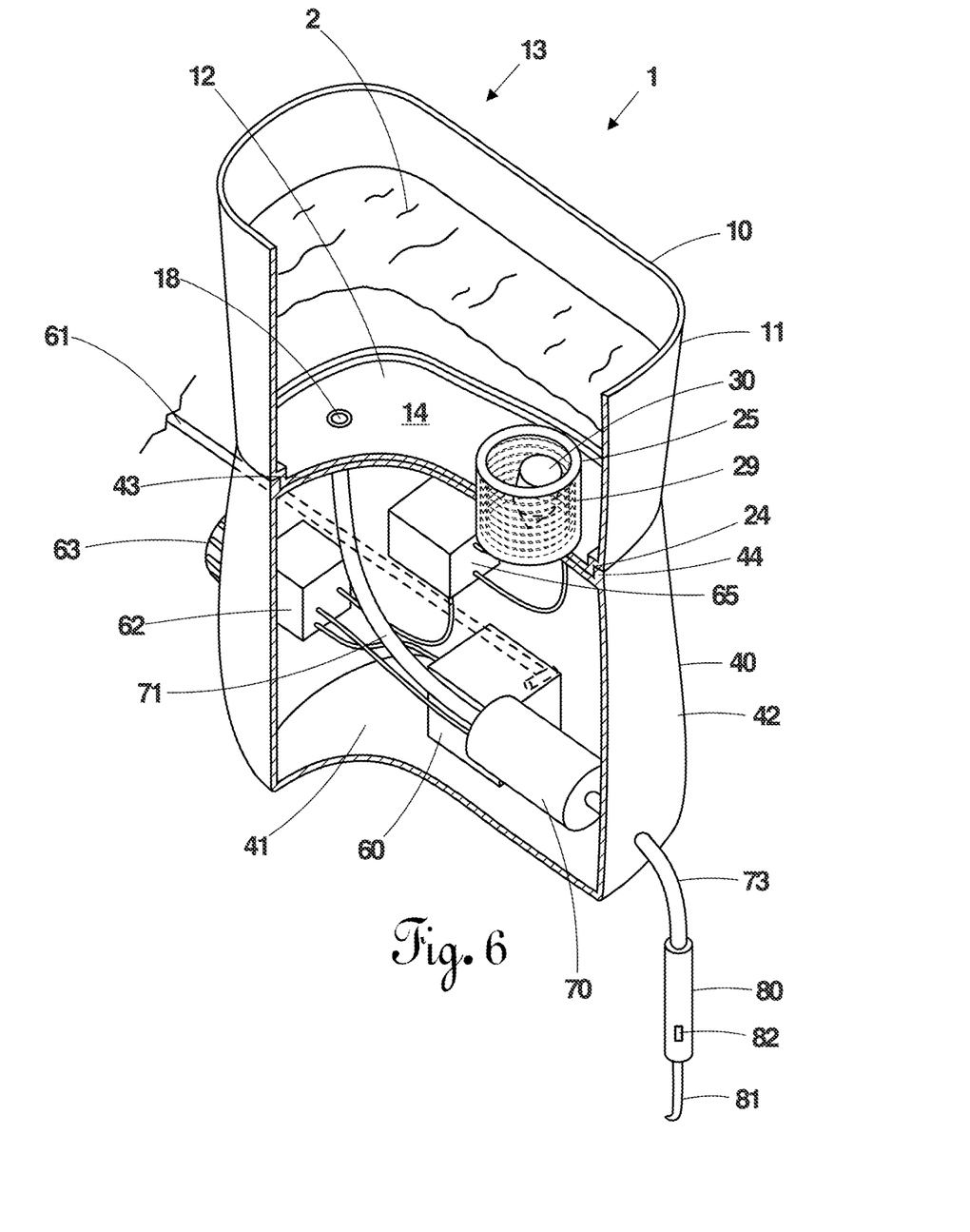
FIG. 6 is a perspective view of a first embodiment with a portion of the sidewall removed wherein the electromagnetic field is not present.
Figure 7:
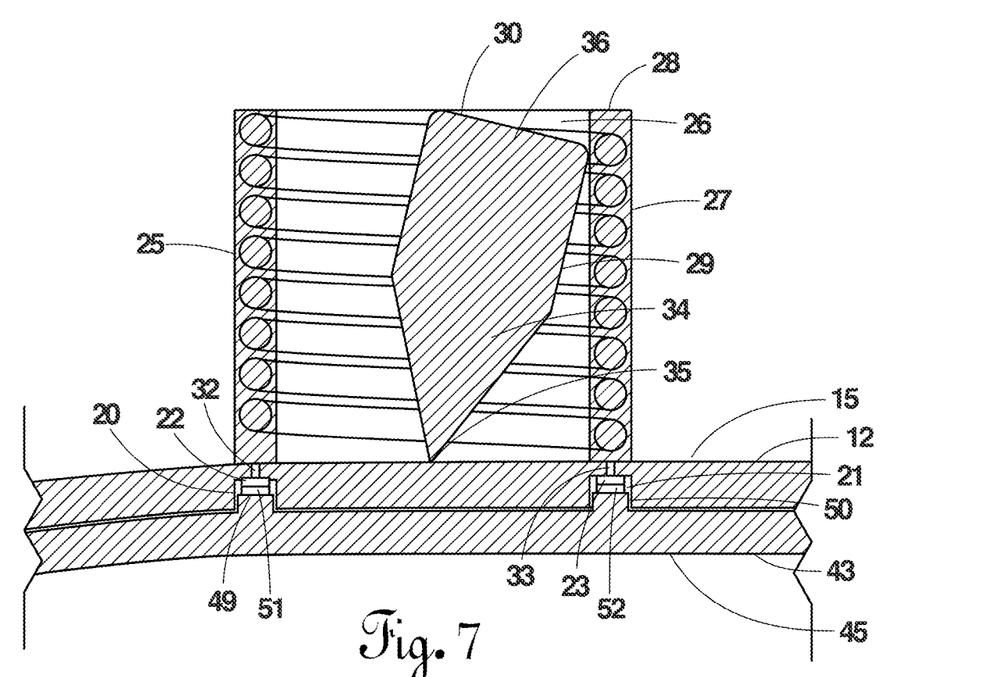
FIG. 7 is a cross-section view of the cylindrical housing of a first embodiment wherein the electromagnetic field is not present.

In operation, the basin 10 is filled with a solution 2 such as water and placed onto the base 40 in a nested arrangement. The raised edge 44 of the base 40 fits into notch 24 of the basin 10, the first tab 49 and second tab 50 fit within the first recess 20 and second recess 21 respectively, the contours of the bottom wall 12 of the basin 10 and top wall 43 of the base 40 are aligned, and port 18 and orifice 48 are aligned. A solute such as NaCl, whitening agent, mouthwash, or other compound such as medicine may be added to the solution. A user then operates the interface 63 to turn the device on. Depending on the setting, the oscillator 65 sends a frequency to the inductive coil 29. An electromagnetic field is generated with the slug 30 acting as an acoustic transducer. The electromagnetic field heats the slug 30, causes it to vibrate, and causes the slug 30 to be vertically positioned on the point 35 within the inner wall 26. The vibration of the heated slug 30 further heats the solution the solution and ultrasonically mixes the solute in the solution. The ninety percent duty cycle causes the electromagnetic field to be on ninety percent of the time and off ten percent of the time. The cyclic pulsing causes the slug 30 to constantly adjust position resulting in further mixing of the solution. FIGS. 1 through 3 show the slug 30 in a vertical position which indicates the electromagnetic field is present. FIGS. 6 and 7 show the slug 30 in a leaned over position when the electromagnetic field is not present. The heated solution aids in both dissolving the solute and in treating temperature sensitive teeth.

The pump 70 receives the solution via the supply tube 71 and then delivers the pressurized solution to the dispenser 80 via the dispensing tube 73. The manual valve 82 on the dispenser 80 may pause the flow of the solution. The operation of the pump 70 is controlled by the controller 62 and may have various pressure settings and various modulating settings. The temperature of the solution may be modified by the controller 62 depending on the frequency of the oscillator 65.

In an alternate embodiment, the cylindrical housing may be integral with the top wall of the base. In this configuration, the first wire and second wire may directly contact the first end and second end of the inductive coil respectively. The bottom wall of the basin may have inset that corresponds to the shape of the cylindrical housing with a convex portion located at the bottom of the inset. This structure would ensure the inductive coil is isolated from the solution by the cylindrical housing and the inset of the basin.

FIGS. 8-11 disclose an additional embodiment of a dental irrigation device 100 comprising a basin 110, a base 140, and a dispenser 180. The basin 110 comprises a sidewall 111, a bottom wall 112, and an open top 113. Alternatively a removable lid may be placed on top of the basin 110. The top surface 114 of the bottom wall 112 is continuous having a raised portion 115 and a lowered portion 116 connected by a slope 117. The lower portion 116 may further slope to a port 118. A continuous notch 124 is formed at the juncture of the sidewall 111 and bottom wall 112.

Figure 8:
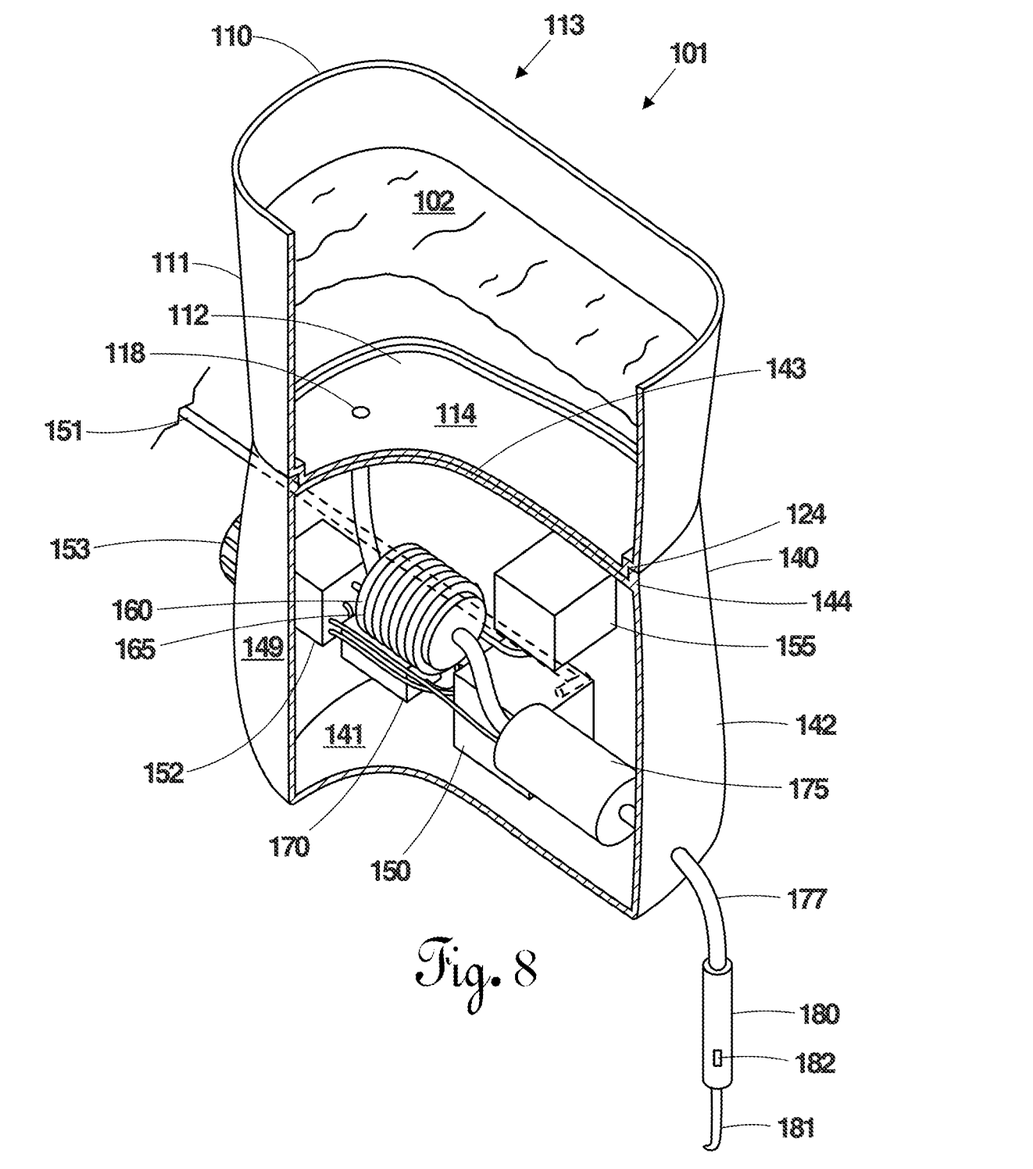
FIG. 8 is a perspective view of a second embodiment with a portion of the sidewall removed.
Figure 9:
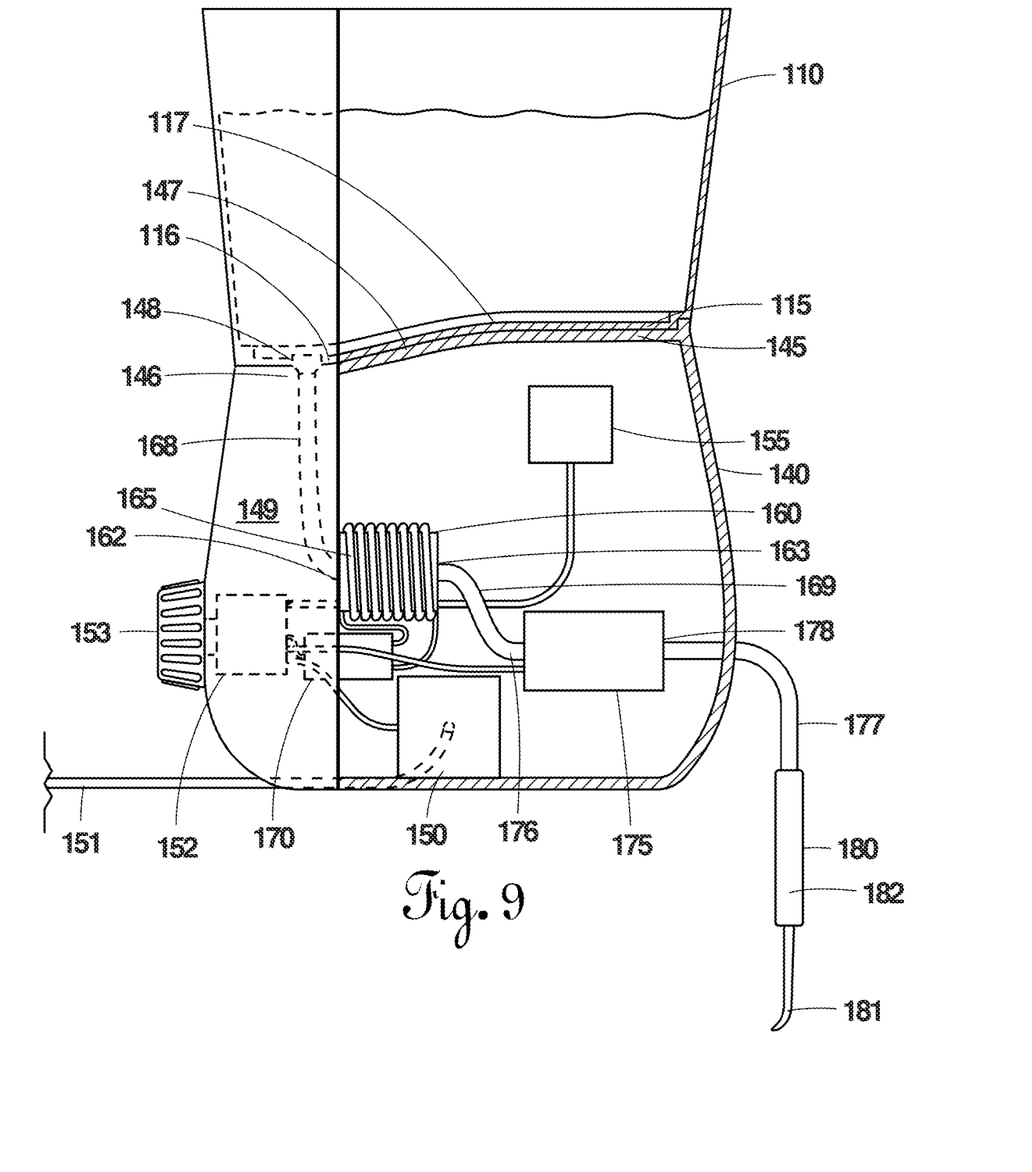
FIG. 9 is a side view of a second embodiment with a portion of the sidewall removed.

The base 140 comprises a bottom wall 141, sidewall 142, and top wall 143. A continuous raised ridge 144 extends from the juncture of the sidewall 142 and top wall 143. The size of the raised ridge 144 corresponds to the size of the notch 124 of the basin 110. The top wall 143 is continuous having a raised portion 145 and a lowered portion 146 connected by a slope 147. The raised portion 145, lowered portion 146, and slope 147 of the top wall 143 of the base 140 correspond to the raised portion 115, lowered portion 116, and slope 117 of the bottom wall 112 of the basin 110. An orifice 148 is positioned through the lower portion 146 of the top wall 143. The orifice 148 is sized to receive the port 118 of the basin 110.

Figure 11:
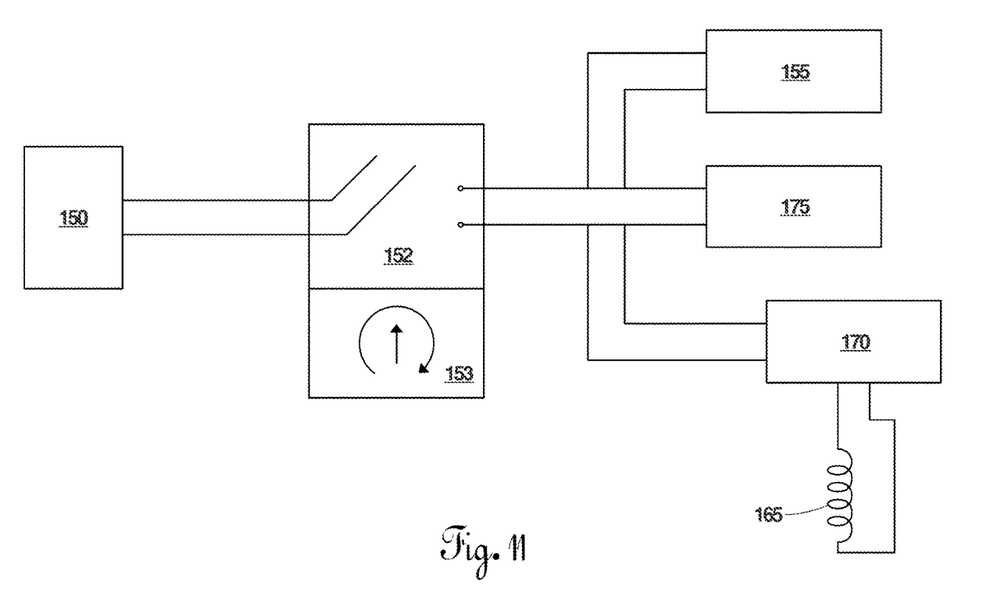
FIG. 11 is a circuit diagram of a second embodiment.

The base 140 includes a power supply module 150, controller 152, a shaker module 155, heating chamber 160, oscillator 170, pump 175, and a dispenser 180. The power supply module 150, positioned within the base 140, receives power via a cord 151 from an AC source. As seen in FIG. 11, the power supply module 150 supplies power to the controller 152, shaker module 155, oscillator 170, and pump 175.

The controller 152, positioned within the base 140, is connected to an interface 153 positioned on the exterior surface 149 of the base 140. The interface 153 may be a physical dial, physical buttons, and/or a graphical user interface. The controller 152 is electronically connected to the shaker module 155, oscillator 170, and the pump 175. An interface that is a mechanically driven timer may serve as the control to the oscillator 170 and may prevent the oscillator 170 from working while a user is not present and may also provide an automatic shutoff. Other safety features may be programmed into the controller 152 to prevent operation over an allotted time, prevent the oscillator 165 from operating at too high or too low of frequency, or other safety measures known in the art to include a flow switch, a water level sensor, and/or a thermostat.

The shaker module 155 is positioned within the base 140 and attached to the sidewall 142 or alternatively to the top wall 143. The shaker module 155 comprises a vibrator or haptic motor in a housing. Once activated, the vibrating motor causes the housing and the sidewall to vibrate which in turn vibrates the basin 110. The vibration permits mixing of a solute within a solvent. The shaker module 155 may be selectively activated through the controller. Alternatively, the shaker module 155 may not include a housing and the haptic motor may be directly attached to the base 140.

Figure 10:
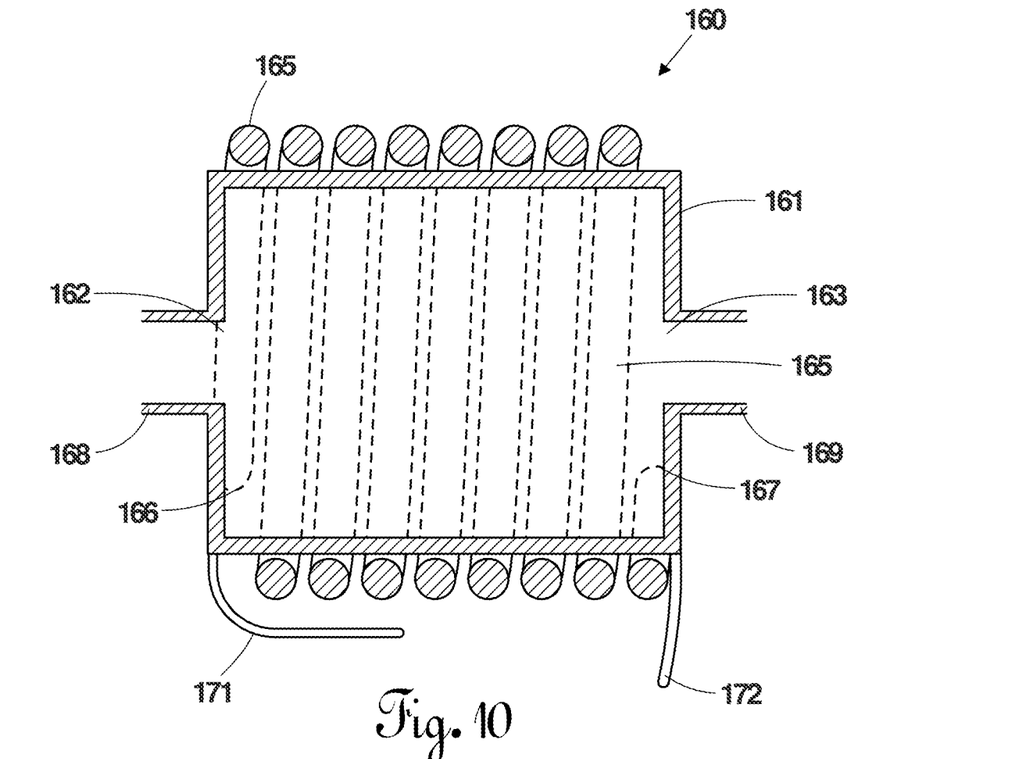
FIG. 10 is a cross-section view of the heating chamber of a second embodiment.

The heating chamber 160 and oscillator 170 are positioned within the base 140. The heating chamber 160 comprises a sidewall 161, inlet 162, and outlet 163 that define a cavity 164. The heating chamber 160 is constructed of a ferrous material. The interior surface of the heating chamber 160 is coated or plated with a non-reactive polymer or a copper plating to inhibit rust formation. An inductive coil 165, having a first end 166 and a second end 167, wraps around the exterior surface of the sidewall 161. The inductive coil 165 may or may not contact the sidewall 161. The inductive coil 165 is preferably insulated. The electronic oscillator 170 is electronically connected to the first end 166 of the inductive coil 165 via a first wire 171 and connected to the second end 167 of the inductive coil 165 via a second wire 172 resulting in a complete circuit. The electronic oscillator 170 is at least capable of delivering a 40-60 kHz signal but may be higher or lower. The structural form of the inductive coil 165 with the oscillator 170 is that of an air core conductor but with the ferrous material of the heating chamber 160 it becomes a ferrous inductor.

A supply tube 168 is connected to the orifice 148 and to the inlet 162 of the heating chamber 160. The supply tube 168 is in fluid communication with the basin 110 via port 118 and orifice 148. An intermediary tube 169 is connected to the outlet 163 of the heating chamber 160 and the inlet 176 of the pump 175. A dispensing tube 177 is connected to the outlet 178 of the pump 175 and the dispenser 180. The supply tube 168, intermediary tube 169, and pump 175 are positioned within the base 140 with a portion of the dispensing tube 177 positioned within the base 140 and extending through the sidewall 142 of the base 140. The pump 175 may provide a continuous flow or modulated flow. The handheld dispenser 180 has tip 181 and is operated by a manual valve 182 which may pause or stop the flow of solution.

In operation, the basin 110 is filled with a solution 101 such as water and placed onto the base 140 in a nested arrangement. The raised edge 144 of the base 140 fits into notch 124 of the basin 110, the contours of the bottom wall 112 of the basin 110 and top wall 143 of the base 140 are aligned, and port 118 and orifice 148 are aligned. A solute such as NaCl, whitening agent, mouthwash, or other compound such as medicine may be added to the solution. A user then operates the interface 153 to turn the device on. If the user is seeking to add a solute, the user may activate the vibrating function through the interface. In this instance, the controller turns on the shaker module 155 which vibrates the basin 110 causing the solute to mix with or dissolve within the solution.

The solution 101 is drawn into the supply tube 168, via the port 118 and orifice 148, through the inlet 162 and into the cavity 164 of the heating chamber. Depending on the heat setting, the oscillator 170 sends a frequency to the inductive coil 165. An electromagnetic field is generated causing the sidewall 161 of the heating chamber 160 to heat up. Additionally, eddy currents are generated creating additional heat that is absorbed by the solution 101. The heated solution 101 aids in both dissolving the solute and in treating temperature sensitive teeth.

The heated solution 101 is drawn into the pump via the intermediary tube and then delivers the pressurized solution 101 to the dispenser 180 via the dispensing tube 177. The manual valve 182 on the dispenser 180 may pause the flow of the solution 101. The operation of the pump 175 is controlled by the controller 152 and may have various pressure settings and various modulating settings. The temperature of the solution 101 may be modified by the controller 152 depending on the frequency of the oscillator 170.

FIGS. 12-15 disclose an additional embodiment of a dental irrigation device 200 comprising a basin 210, a base 240, and a dispenser 280. The basin 210 comprises a sidewall 211, a bottom wall 212, and an open top 213. Alternatively a removable lid may be placed on top of the basin 210. The top surface 214 of the bottom wall 212 is continuous having a raised portion 215 and a lowered portion 216 connected by a slope 217. The lower portion 216 may further slope to a port 218. A continuous notch 224 is formed at the juncture of the sidewall 211 and bottom wall 212.

Figure 12:
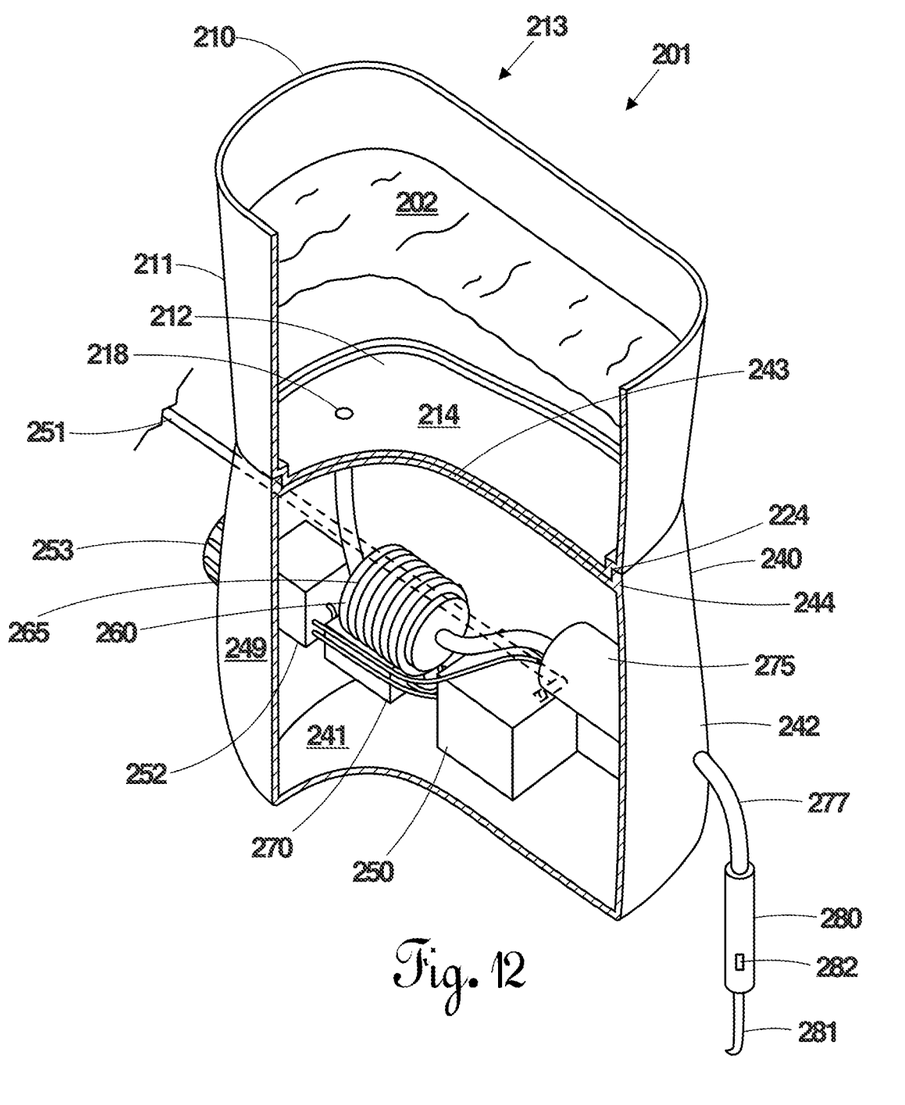
FIG. 12 is a perspective view of a third embodiment with a portion of the sidewall removed.
Figure 13:
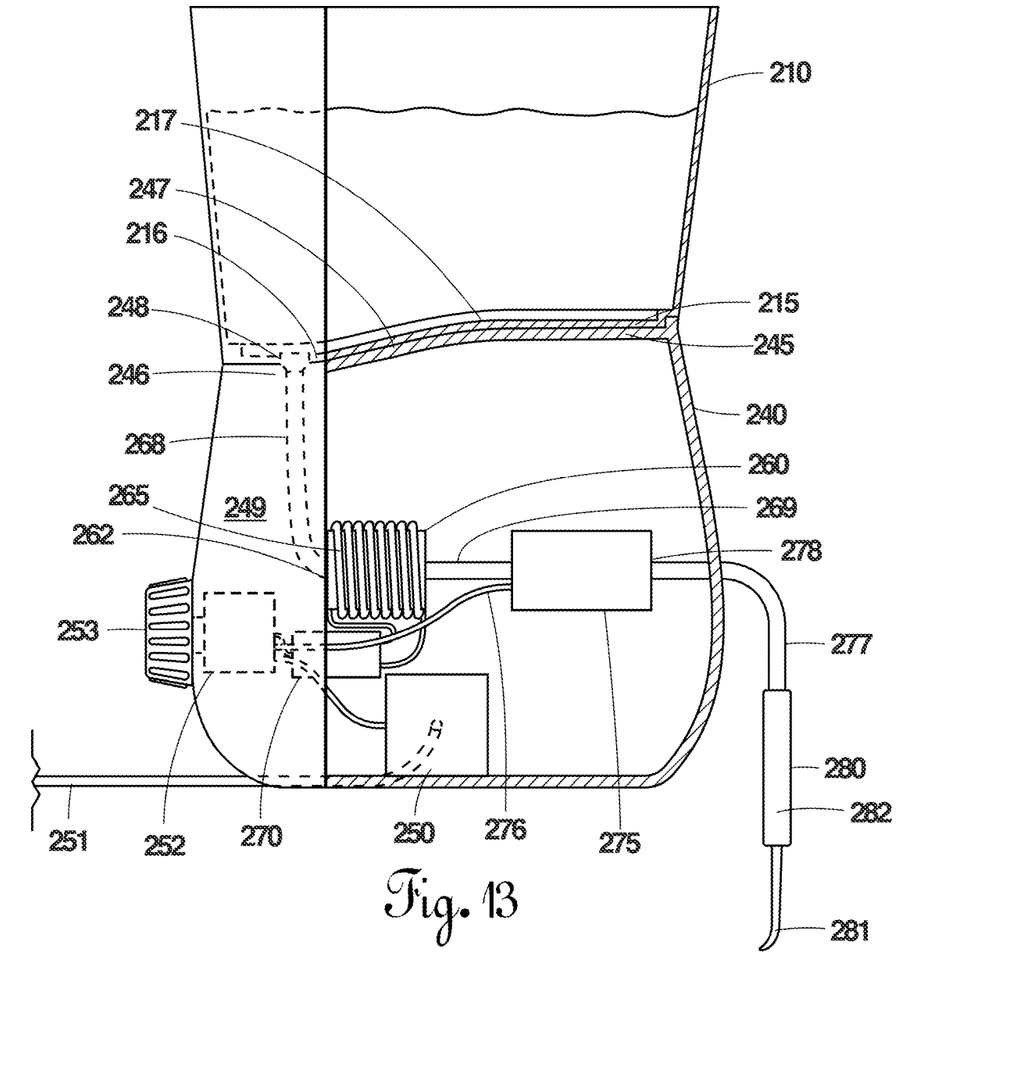
FIG. 13 is a side view of a third embodiment with a portion of the sidewall removed.

The base 240 comprises a bottom wall 241, sidewall 242, and top wall 243. A continuous raised ridge 244 extends from the juncture of the sidewall 242 and top wall 243. The size of the raised ridge 244 corresponds to the size of the notch 224 of the basin 210. The top wall 243 is continuous having a raised portion 245 and a lowered portion 246 connected by a slope 247. The raised portion 245, lowered portion 246, and slope 247 of the top wall 243 of the base 240 correspond to the raised portion 215, lowered portion 216, and slope 217 of the bottom wall 212 of the basin 210. An orifice 248 is positioned through the lower portion 246 of the top wall 243. The orifice 248 is sized to receive the port 218 of the basin 210.

Figure 15:
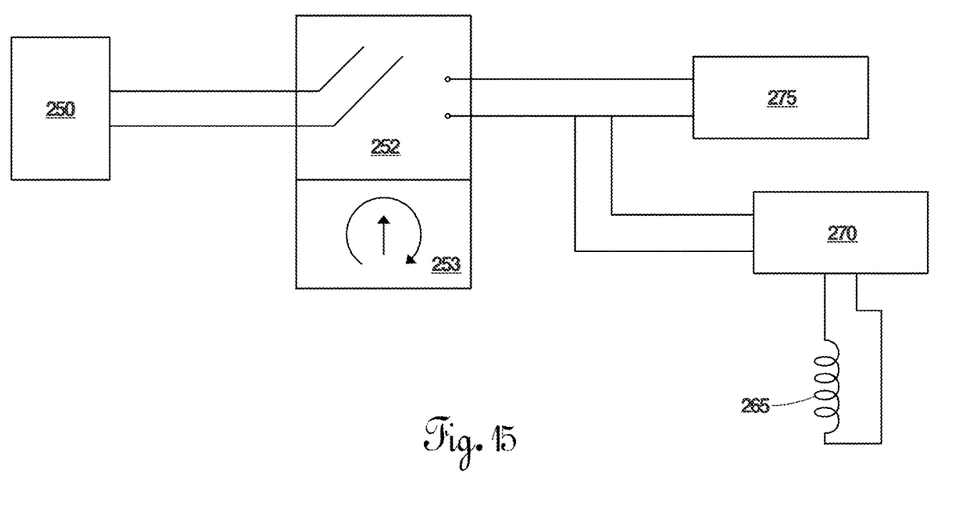
FIG. 15 is a circuit diagram of a third embodiment.

The base 240 includes a power supply module 250, controller 252, heating chamber 260, oscillator 270, pump 275, and a dispenser 280. The power supply module 250, positioned within the base 240, receives power via a cord 251 from an AC source. As seen in FIG. 15, the power supply module 250 supplies power to the controller 252, oscillator 270, and pump 275.

The controller 252, positioned within the base 240, is connected to an interface 253 positioned on the exterior surface 249 of the base 240. The interface 253 may be a physical dial, physical buttons, and/or a graphical user interface. The controller 252 is electronically connected to the oscillator 270, and the pump 275. An interface that is a mechanically driven timer may serve as the control to the oscillator 270 and may prevent the oscillator from 270 working while a user is not present and may also provide an automatic shutoff. Other safety features may be programmed into the controller 252 to prevent operation over an allotted time, prevent the oscillator 265 from operating at too high or too low of frequency, or other safety measures known in the art to include a flow switch, a water level sensor, and/or a thermostat.

Figure 14:
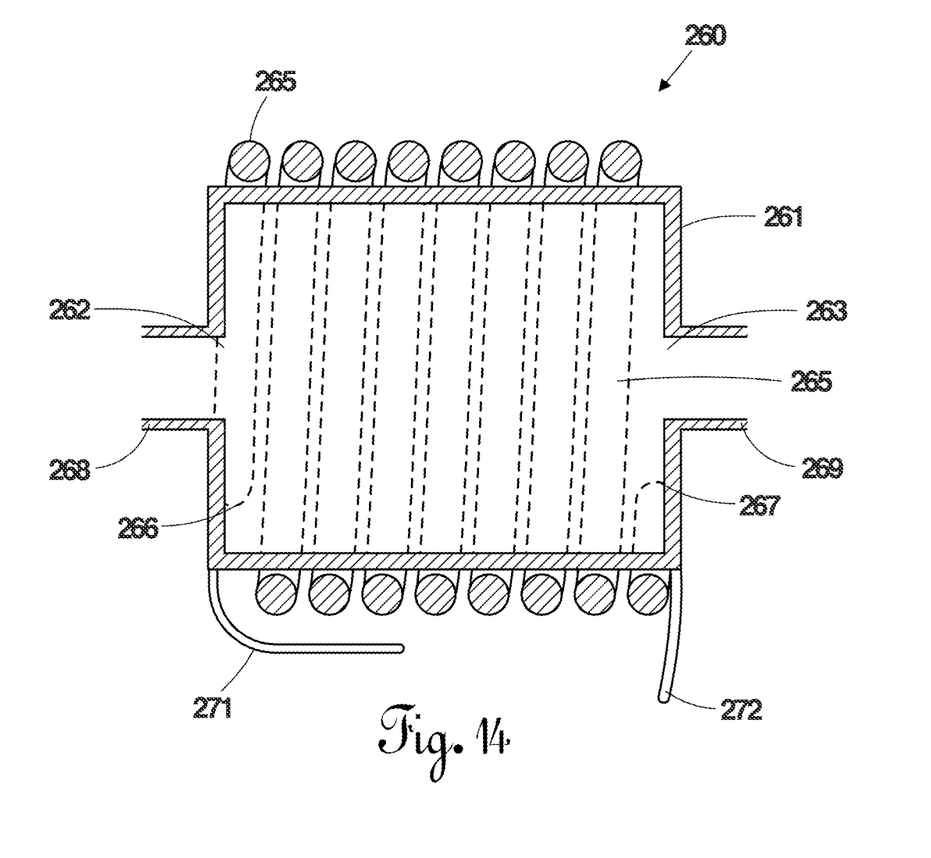
FIG. 14 is a cross-section view of the heating chamber of a third embodiment.

The heating chamber 260 and oscillator 270 are positioned within the base 240. The heating chamber 260 comprises a sidewall 261, inlet 262, and outlet 263 that define a cavity 264. The heating chamber 260 is constructed of a ferrous material. The interior surface of the heating chamber 260 is coated or plated with a non-reactive polymer or a copper plating to inhibit rust formation. An inductive coil 265, having a first end 266 and a second end 267, wraps around the exterior surface of the sidewall 261. The inductive coil 265 may or may not contact the sidewall 261. The inductive coil 265 is preferably insulated. The electronic oscillator 270 is electronically connected to the first end 266 of the inductive coil 265 via a first wire 271 and connected to the second end 267 of the inductive coil 265 via a second wire 272 resulting in a complete circuit. The electronic oscillator 270 is at least capable of delivering a 40-60 kHz signal but may be higher or lower. The structural form of the inductive coil 265 with the oscillator 270 is that of an air core conductor but with the ferrous material of the heating chamber 260 it becomes a ferrous inductor.

The pump 275 comprises a shaft having an eccentric weight. As the shaft turns, the eccentric weight causes the pump 275 to vibrate. This vibration causes the base 240 and the basin 210 to vibrate. The vibration permits mixing of a solute within a solvent.

A supply tube 268 is connected to the orifice 248 and to the inlet 262 of the heating chamber 260. The supply tube 268 is in fluid communication with the basin 210 via port 218 and orifice 248. An intermediary tube 269 is connected to the outlet 263 of the heating chamber 260 and the inlet 276 of the pump 275. A dispensing tube 277 is connected to the outlet 278 of the pump 275 and the dispenser 280. The supply tube 268, intermediary tube 269, and pump 275 are positioned within the base 240 with a portion of the dispensing tube 277 positioned within the base 240 and extending through the sidewall 242 of the base 240. The pump 275 may provide a continuous flow or modulated flow. The handheld dispenser 280 has tip 281 and is operated by a manual valve 282 which may pause or stop the flow of solution.

In operation, the basin 210 is filled with a solution 201 such as water and placed onto the base 240 in a nested arrangement. The raised edge 244 of the base 240 fits into notch 224 of the basin 210, the contours of the bottom wall 212 of the basin 210 and top wall 243 of the base 240 are aligned, and port 218 and orifice 248 are aligned. A solute such as NaCl, whitening agent, mouthwash, or other compound such as medicine may be added to the solution. A user then operates the interface 253 to turn the device on. The pump 275 draws the solution 201 into the supply tube 268, via the port 218 and orifice 248, through the inlet 262 and into the cavity 264 of the heating chamber 260. Depending on the heat setting, the oscillator 270 sends a frequency to the inductive coil 265. An electromagnetic field is generated causing the sidewall 261 of the heating chamber 260 to heat up. Additionally, eddy currents are generated creating additional heat that is absorbed by the solution 201. The heated solution 201 aids in both dissolving the solute and in treating temperature sensitive teeth.

The heated solution 201 is drawn into the pump 275 via the intermediary tube and then delivers the pressurized solution 201 to the dispenser 280 via the dispensing tube 277. The manual valve 282 on the dispenser 280 may pause the flow of the solution 201. The operation of the pump 275 is controlled by the controller 252 and may have various pressure settings and various modulating settings. The temperature of the solution 201 may be modified by the controller 252 depending on the frequency of the oscillator 270.

A person of ordinary skill in the art may modify the circuit of each embodiment to add safety measures and/or additional controls to prevent over mixing, over-heating, or reduce potential for electric shocks.

Although the invention hereof has been described by way of preferred embodiments, it will be evident that other adaptations and modifications can be employed without departing from the spirit and scope thereof. The terms and expressions employed herein have been used as terms of description and not of limitation; and thus, there is no intent of excluding equivalents, but on the contrary it is intended to cover any and all equivalents that may be employed without departing from the spirit and scope of the invention.

I claim:

1. A dental irrigation device comprising
a basin having a bottom wall and an outlet;
an oscillator in electrical communication with an inductor coil;
a ferrous slug having a conical portion;
a dispenser; and
a pump in fluid communication with the outlet and the dispenser.

2. The dental irrigation device of claim 1 further comprising a housing having an open top end and a sidewall comprising an inner sidewall and outer sidewall wherein at least a portion of the inductor coil is positioned within the sidewall and wherein the sidewall extends from the bottom wall of the basin.

3. The dental irrigation device of claim 2 wherein the ferrous slug is positioned within the inner wall of the housing with the conical portion in contact with the bottom wall of the basin.

4. The dental irrigation device of claim 3 wherein the oscillator generates a square wave between 40 and 60 kHz.

5. The dental irrigation device of claim 4 wherein the oscillator operates at a 90 percent duty cycle.

6. A method of mixing and heating a solute in a solvent for cleaning the oral cavity comprising the steps of:
placing a solvent in the basin of a dental irrigation device wherein the dental irrigation device further comprises:
an oscillator in electrical communication with an inductor coil;
a housing having an open top end and a sidewall comprising an inner sidewall and outer sidewall wherein at least a portion of the inductor coil is positioned within the sidewall and wherein the sidewall extends from a bottom wall of the basin;
a ferrous slug positioned within the housing between the inner sidewall; and
a pump in fluid communication with a dispenser;
adding a solute to the solvent;
generating an electromagnetic field within the housing through delivering a 40 to 60 kHz signal from the oscillator to the inductor coil; and
delivering the solvent through the dispenser via the pump.

7. The method of claim 6 wherein a portion of the top surface of bottom wall between the inner sidewall of the housing is convex.

8. The method of claim 6 wherein the ferrous slug comprises a conical portion having a point and further wherein the point of the conical portion is placed against the bottom wall within the housing.

9. The method of claim 8 wherein the oscillator operates at a 90 percent duty cycle.

10. The method of claim 8 wherein the oscillator generates a square wave signal.

11. A dental irrigation device comprising
a basin having a bottom wall with a top surface and a bottom surface and an outlet;
a cage having openings attached to the top surface of the bottom wall;
a ferrous slug positioned within the cage;
a chamber having a ferrous sidewall defining an inner cavity, an entry port, and an exit port;
an inductor coil wrapped around the exterior of the sidewall of the chamber;
an oscillator in electrical communication with the inductor coil;
a dispenser;
a motor in rotational mechanical communication with a rod magnet wherein the rod magnet is positioned near the bottom surface of the bottom wall and the cage;
a pump in fluid communication with the outlet, the chamber, and the dispenser; and
a controller in electrical communication with the oscillator, motor, and pump.

12. The dental irrigation device of claim 11 wherein the oscillator generates a signal between 40 and 60 kHz.

13. The dental irrigation device of claim 11 wherein the inner surface of the chamber is coated with a non-oxidative material.

14. The dental irrigation device of claim 11 further comprising a power module in electrical communication with the controller, pump, oscillator, and motor.

15. The dental irrigation device of claim 11 wherein a shaft connects the motor to the rod magnet.

16. A method of mixing and heating a solute in a solvent for cleaning the oral cavity comprising the steps of:
placing a solvent in the basin of a dental irrigation device wherein the dental irrigation device further comprises:
a basin having a bottom wall with a top surface and a bottom surface and an outlet;
a cage having openings attached to the top surface of the bottom wall;
a ferrous slug positioned within the cage;
a chamber having a ferrous sidewall defining an inner cavity, an entry port, and an exit port;
an inductor coil wrapped around the exterior of the sidewall of the chamber;
an oscillator in electrical communication with the inductor coil;
a dispenser;
a motor in rotational mechanical communication with a rod magnet wherein the rod magnet is positioned near the bottom surface of the bottom wall, the cage, and the ferrous slug;
a pump in fluid communication with the outlet, the chamber, and the dispenser; and
a controller in electrical communication with the oscillator, motor, and pump;
adding a solute to the solvent;
mixing the solute in the solvent by activation of the motor;
heating the solvent in the chamber by generating an electromagnetic field within the chamber through delivering a 40 to 60 kHz signal from the oscillator to the inductor coil; and
delivering the solvent through the dispenser via the pump.

17. A dental irrigation device comprising
a basin having an outlet;
a means for vibrating the basin;
a chamber having a ferrous sidewall defining an inner cavity, an entry port, and an exit port;
an inductor coil wrapped around the exterior of the sidewall of the chamber;
an oscillator in electrical communication with the inductor coil;
a dispenser;
a pump in fluid communication with the outlet, the chamber, and the dispenser; and
a controller in electrical communication with the oscillator pump, and the means for vibrating the basin.

18. The dental irrigation device of claim 17 wherein the means for vibrating the basin is a shaker module.

19. The dental irrigation device of claim 17 wherein the means for vibrating the basin is a pump having a shaft with an eccentric weight wherein the pump and the pump having a shaft with an eccentric weight are the same.

20. The dental irrigation device of claim 17 wherein the means for vibrating the basin is a pump powered by a haptic motor wherein the pump and the pump powered by a haptic motor are the same.

21. The dental irrigation device of claim 17 wherein the oscillator generates a signal between 40 and 60 kHz.

22. The dental irrigation device of claim 17 wherein the inner surface of the chamber is coated with a non-oxidative material.

* * * * *